US005450662A

United States Patent [19]

Watts

[11] Patent Number: 5,450,662

[45] Date of Patent: Sep. 19, 1995

[54] APPARATUS AND METHOD OF REBROACHING A LOCK ASSEMBLY

[76] Inventor: James A. Watts, 2450 W. 82 St., Unit 201, Hialeah, Fla. 33016

[21] Appl. No.: 189,116

[22] Filed: Jan. 27, 1994

[51] Int. Cl.$^{6}$ ..................... B23P 13/00

[52] U.S. Cl. ..................... 29/401.1; 29/426.1; 29/804; 70/494

[58] Field of Search ..................... 29/401.1, 402.01, 402.03, 29/402.08, 426.1, 804; 70/382–385, 392, 493–495

[56] References Cited

U.S. PATENT DOCUMENTS

| | | | |
|---|---|---|---|
| Re. 30,198 | 1/1980 | Oliver et al. | 70/364 A |
| 685,772 | 11/1901 | Lapointe . | |
| 2,510,835 | 5/1946 | Rice | 90/33 |
| 3,175,378 | 3/1965 | Russell | 70/383 X |
| 3,987,654 | 10/1976 | Iaccino et al. | 70/494 |
| 4,142,391 | 3/1979 | Paig | 70/461 |
| 4,444,033 | 4/1984 | Deckert | 70/364 A |
| 4,635,455 | 1/1987 | Oliver | 70/364 A |
| 4,672,828 | 6/1987 | Theriault | 70/373 |
| 4,712,401 | 12/1987 | Monahan | 70/382 |
| 4,732,022 | 3/1988 | Oliver | 70/406 |
| 4,836,002 | 6/1989 | Monahan | 70/384 X |
| 4,876,783 | 10/1989 | Campion et al. | 29/401.1 |
| 4,998,426 | 3/1991 | Genakis | 70/494 |
| 5,036,575 | 8/1991 | Campion et al. | 29/401.1 |
| 5,088,306 | 2/1992 | Field | 70/375 |
| 5,150,996 | 9/1992 | Thoroughman | 409/259 |
| 5,182,929 | 2/1993 | Myers | 70/337 |

*Primary Examiner*—S. Thomas Hughes

*Attorney, Agent, or Firm*—Robert M. Schwartz; Edward I. Mates

[57] ABSTRACT

A previously used lock assembly constructed for operation using a given key may be operated by a different key after rebroaching. Instead of requiring an expensive, complete replacement of a lock assembly and its operable keys, the present invention allows a lock assembly to be refitted for a different key by a relatively inexpensive replacement of its plug and at least one of the tumbler components, preferably the bottom pin only, of one or more preexisting sets of tumbler components, as needed to modify the lock to receive the different key.

7 Claims, 4 Drawing Sheets

APPARATUS AND METHOD OF REBROACHING A LOCK ASSEMBLY

BACKGROUND OF THE INVENTION

1. Field of the Invention

The present invention relates generally to a cylinder lock of the type that uses a keyway adapted to receive a specially milled key blank that is bitted to fit a particular lock. More specifically, this invention relates to rebroaching a previously broached twisting tumbler cylinder lock comprising a cylinder plug having a given longitudinal axis and rotatable within a cylinder shell about said longitudinal axis under the control of a plurality of twisting tumblers. Such locks are constructed and arranged to have a large number of possible pin tumbler combinations of angles, positions and depths.

2. State of the Prior Art

In the past, the assignee of various patents covering lock devices maintained a security list of the construction and arrangement of the components of each lock of this type and included with this list the location of the particular lock so that in case a key capable of opening the lock in question was lost, a new security bitting could be provided without causing the owner of the key to lose his security.

Each of the twisting tumblers of a preexisting lock of the prior art locks to be modified to provide a novel lock assembly of this invention is provided with a bottom pin having key-contactable surface means, provided by a key contacting point at each tumbler position. Each key contacting point is oriented at any one of three different angles and is located at any one of several different depths. Each of the tumblers comprises a preexisting set of tumbler components comprising a spring, a top pin or driver, and an aforesaid bottom pin. A removable cover holds an associated set within a separate cylindrical pin chamber associated with each tumbler set corresponding thereto. Each of the bottom pins has a flag that extends radially outward from its upper portion through an axial slot in the peripheral wall of the corresponding cylindrical pin chamber. The flag extends through the axial slot to orient its associated tumbler in a given radial plane common to corresponding axial slots of remaining pin chambers spaced along the longitudinal axis of the cylinder plug.

The construction just described provides a broach for each cylindrical pin chamber. The broaches for the cylindrical pin chambers are oriented in a common radial plane extending through the given longitudinal axis. In this manner, an owner of a series of patents on various locks of the type described generally could control an inventory of key bittings sold to different customers and provide any customer with a substitute key whenever an original key provided to open any lock in the inventory of locks maintained by the patent owner was lost. However, after certain of the patents controlling these locks expired, it became a misuse of patents for a patentee to continue to control the sale of unpatentable keys for opening locks covered by the expired patents. It became a matter of public interest for one skilled in the art of lock making to develop a technique whereby a preexisting lock no longer protected by a patent could be used in a combination with a key of different milling without extending the effective period of patent protection for the lock.

The following patents of which the inventor is aware represent the state of the prior art to the best of the knowledge of the inventor.

U.S. Pat. No. 685,772, issued Nov. 5, 1901 to Lapointe, shows a key seat cutter that reciprocates to cut grooves, key-seats or splines in the inner faces of hubs, collars, sleeves and the like, but is not capable of creating a broach.

U.S. Pat. No. 2,510,835 to Rice, issued Jun. 6, 1950, shows a broaching tool that requires multiple cutting steps and a press to form a broach. The broaching tool of this patent has no provision for aligning the tool with a work piece.

U.S. Pat. No. 3,722,240 issued to Oliver, Mar. 23, 1973, and Re. Pat. No. 30,198, reissued Jan. 29, 1980, disclose lock systems having a shell containing a plurality of pin chambers, each provided with a pin cut at three different levels and at three different angles to provide 3125 different combinations for a five cylinder lock.

U.S. Pat. No. 4,142,391, issued Mar. 6, 1979 to Paig shows a re-keying locking kit that does not include a broach as one of its elements.

U.S. Pat. No. 4,444,033 to Deckert, issued Apr. 24, 1984, shows a pin tumbler lock that is without a broach. Pin bores in one or more plugs are capable of alignment with pin bores in exterior members, so that the plugs may be used with different exterior members.

U.S. Pat. No. 4,635,455, issued Jan. 13, 1987 to Oliver, shows a cylinder lock with twisting tumblers at tumbler positions selectively offset forwardly or rearwardly and selectively rotatable to different angular positions to create an enormous number of keying combinations.

U.S. Pat. No. 4,672,828, issued Jun. 16, 1987 to Theriault, shows a key-in-knob cylinder replacement system that has no broach, only a slot 14 having shoulders 54A and 54B to limit movement of the top 53 of one master pin 15 along slot 14.

U.S. Pat. No. 4,712,401, issued Dec. 15, 1987 to Monahan, shows a re-keyable lock constructed and arranged for inserting and removing master pins of different depth without removing a master pin from the lock. This patent also lacks a broach.

U.S. Pat. No. 4,732,022 issued Mar. 22, 1988 to Oliver, shows a multiple pin tumbler type of lock similar to that shown in U.S. Pat. No. 4,635,455 to Oliver.

U.S. Pat. No. 4,876,783, issued Oct. 31, 1989 and U.S. Pat. No. 5,036,575, issued Aug. 6, 1991, both to Campion et al., show method and apparatus for converting doorknob lock sets to a system utilizing a universal knob and a selected lock cylinder.

U.S. Pat. No. 5,088,996, issued Feb. 12, 1992 to Field, shows a cylinder lock with a changeable keyway. The plug of the lock is reconfigured by inserting conversion parts into its keyway to accept keys of different configuration. This lock also lacks a broach.

U.S. Pat. No. 5,150,996, issued Sep. 29, 1992 to Thoroughman, shows a keyway broach guide assembly that requires a machine or press to accomplish broaching. This patent has no guide for aligning a broach, no capability of manual operation and requires shims and friction pieces as part of the patented assembly.

U.S. Pat. No. 5,182,929, issued Feb. 2, 1993 to Myers, shows a method and replacement plug for cylinder locks that converts locks having special keyways requiring correspondingly milled key blanks into a universal keyway lock that can be operated by a multiplicity of differently milled keys.

BRIEF DESCRIPTION OF THE PRESENT INVENTION

This invention teaches the lock-making art to rebroach an existing lock in such a manner that it requires a key of different milling to operate the rebroached lock than that of the original key. The original owner of the lock may reuse the main portion of the lock assembly, namely, its shell and certain tumbler component means, after the lock is rebroached, and also benefit from the security and control available from using certain different component(s) and a new key of different milling replacing at least one of the original components and the original key that caused the lock assembly to operate prior to said rebroaching, respectively.

In this invention, a preexisting lock of the cylinder type operable by a specially milled key blank bitted to fit a particular cylinder lock and having a cylinder plug rotatable within a cylinder shell with a series of cylindrical pin chambers previously broached along a first common plane to provide key contacting points at the bottom portion of the bottom pin of each tumbler of a series of axially spaced tumblers to receive a milled key blank along said first common plane is modified by rebroaching each cylindrical pin chamber along a second common radial plane at a fixed angle to the first common radial plane around the perimeter of each cylinder pin chamber. Also, the bottom tumbler of at least one of the sets of tumblers in at least one of the cylindrical pin chambers is replaced by a replacement bottom tumbler.

At least one of the bottom pins of a replacement tumbler has a different lower surface shape from that of the removed bottom pin. The new bottom pin or pins is (are) inserted within the cylindrical pin chamber with the flag of its bottom pin extending through a second slot in the wall of each cylindrical pin chamber formed by the second broaches in the cylindrical pin chambers along the second common radial plane.

Only the cylinder plug and certain bottom pins are replaced when one follows the teaching of this invention. In the past, an entirely new assembly of lock and key was needed to assure security for the system. Thus, this invention results in considerable saving compared to the cost of replacing an entire lock and key assembly.

In the method aspect of the present invention, an existing cylinder block is disassembled by removing any existing springs, top pins and bottom pins from a preexisting set of components from any pin chamber to be modified, and which they occupied prior to starting the modification of the broaching arrangement of the pin chamber to be modified according to the teachings of this invention. Its plug is then withdrawn from its shell and the components are replaced with a new set of components that includes a bottom pin constructed and arranged to provide for each modified pin chamber at least one of the key-contactable surface means having a different configuration from that provided on the preexisting key-contacting means that occupied the pin chamber previous to the rebroaching.

As an alternative, the springs and top pins need not be replaced because they can be made to be interchangeable for each pin chamber. Consequently, only certain bottom pins, the plug, and the key need be replaced to maintain security and control for the lock modified by rebroaching.

Each cylindrical pin chamber is broached along a second common radial plane extending at a fixed angle to the first radial plane common to the preexisting broaches. A new set of components is inserted into at least one of said cylindrical pin chambers with the flag of its bottom pin aligned with the newly applied broach. At least one of the new sets has a bottom pin different from the bottom pin of the corresponding set it replaces. The key-contacting bottom surfaces of the bottom pins of the sets cooperate to form key-contacting surface means that conform to the shape of a replacement key that differs from the shape of the key previously bitted to the shape of the preexisting key-contacting bottom surface means.

In order to enable the replacement key to operate the rebroached lock, a new plug, that cooperates with the new sets of components (comprising a top pin, a spring and a bottom pin with a flag within each cylindrical pin chamber), is inserted within a rebroached cylindrical shell. The new broaches of the rebroached shell lie in a common radial plane at a second orientation to the longitudinal axis of the shell so that the flags of said bottom pins are received in the newly formed broaches in circumferentially spaced relation from the corresponding original broaches for said preexisting cylindrical pin chambers. Hence, after said rebroaching, the rebroached shell now cooperates with the new plug in such a manner that the flags of the replacement bottom pins are held in a new orientation relative to the cylinder shell and thus present a different shape of key-contacting means than what the pre-existing components and plugs provided prior to rebroaching.

As a result of the rebroaching and the resulting reorientation of the flags within the cylinder shell, a key suitable to unlock a lock prior to the rebroaching is unable to unlock the lock after its rebroaching and reorientation of its cylinder plug. Therefore, previously purchased locks capable of being opened by a preexisting key are no longer susceptible of entry after the lock has been rebroached and its cylinder plug is replaced within its cylinder shell.

A previously used lock made for a particular door for opening by a particular key may now be used with a key having a different bit suitable for a different lock from the one for which the preexisting key was made. In other words, this invention makes possible a relatively inexpensive way to continue use of a preexisting lock with a different key from the original key, thus enabling a user of the rebroached lock to retain his or her security without requiring complete replacement of the entire lock system.

BRIEF DESCRIPTION OF THE DRAWINGS

The benefits of this invention will be better understood in the light of a description of a preferred embodiment that follows. In the drawings that form part of the description of the preferred embodiment and wherein like reference numbers refer to like structural elements.

DESCRIPTION OF PREFERRED EMBODIMENT

The details of a preferred embodiment of this invention will be better understood in the light of a description thereof that follows, particularly when the reader follows the set of drawings that forms part of this description.

The lock assembly of this invention comprises a preexisting shell (11), preferably of cylindrical shape and made of a metal such as brass, having a series of cylindrical pin chambers (12) axially spaced in equally spaced relation along the length of shell (11). Each cylindrical pin chamber (12) extends radially through the thickness of the wall of shell (11) and a preexisting broach (13) is provided along a first common radial plane that intersects the main longitudinal axis of shell (11).

Figure 1:
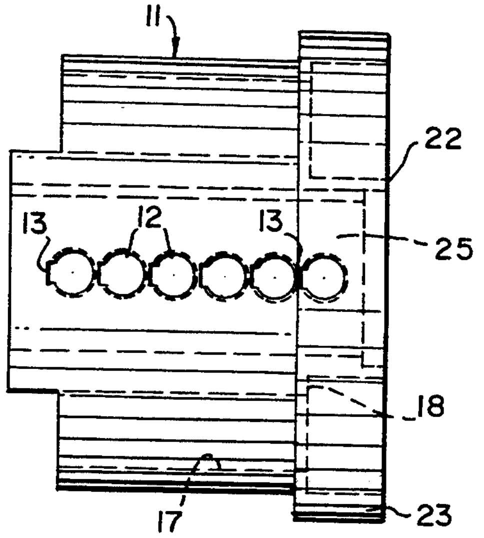
FIG. 1 is a top plan view of a shell of a lock assembly showing a plurality of cylindrical pin chambers, each having a preexisting broach.
Figure 2:
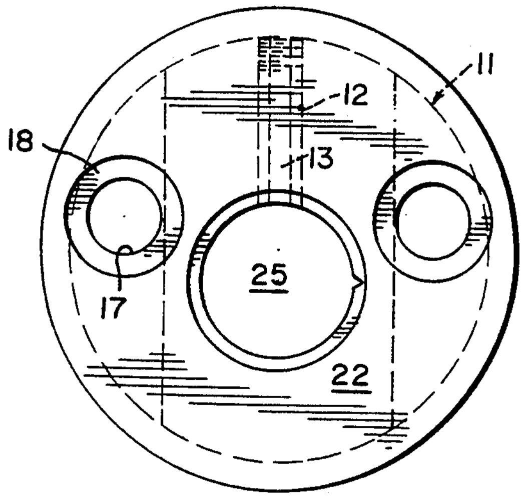
FIG. 2 is a front view of the shell of FIG. 1.
Figure 3:
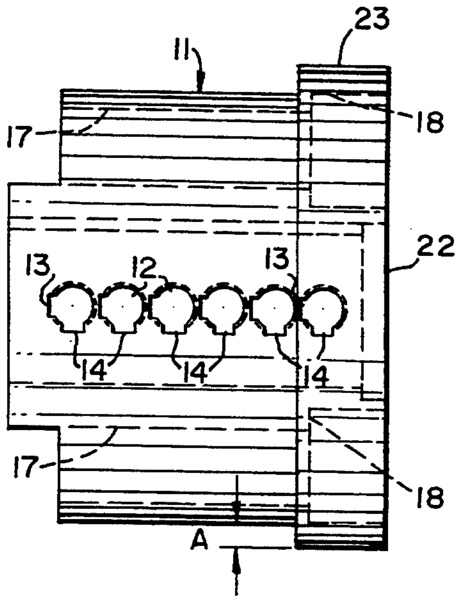
FIG. 3 is a top plan view of the shell of FIG. 1 after the shell is rebroached according to the present invention.

FIG. 3 shows how a second set of broaches (14) is constructed and arranged relative to each preexisting broach (13). Specifically, each broach (14) of the second set of broaches is associated with a corresponding preexisting broach (13) for each cylindrical pin chamber (12) and its common radial plane is offset circumferentially from the common radial plane of its corresponding preexisting broach (13) by a uniform angle. While FIG. 3 indicates a uniform angle of 90 degrees, it is understood that any oblique angle of significant size may be substituted for positioning the common radial plane for broaches (14) of the second set of broaches relative to the common radial plane of the preexisting broaches (13) in each corresponding cylindrical pin housing (12).

Figure 4:
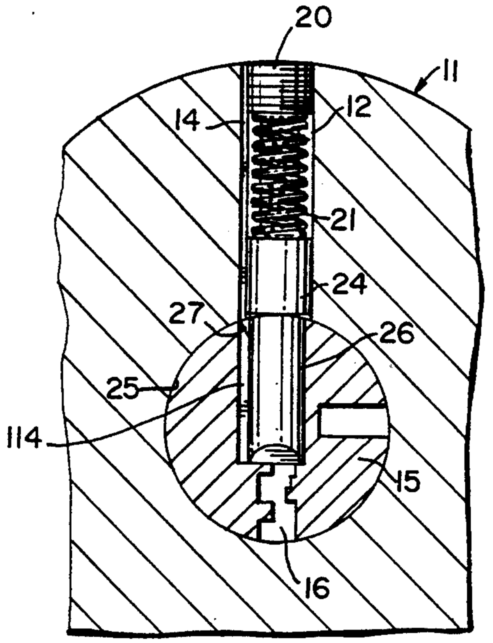
FIG. 4 is an enlarged, fragmentary sectional view, partly in elevation, of one of the cylindrical pin chambers of FIG. 3, showing how its cap, spring, top pin and bottom pin are arranged relative to a plug of said lock assembly.
Figure 6:
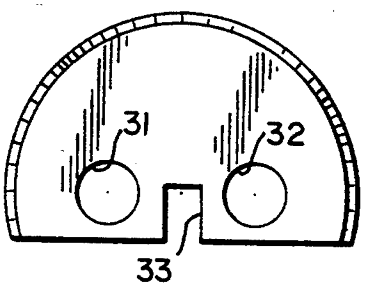
FIG. 6 is a top view of the broach guide of FIG. 5, with the aligning pin of FIG. 5 removed.
Figure 16:
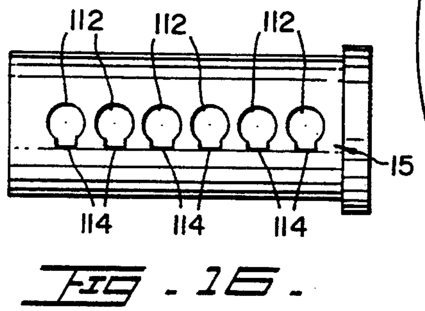
FIG. 16 is a top view of a replacement plug provided with a set of longitudinally spaced chambers having broaches that are aligned with a second set of broaches in said shell, after the shell is rebroached.
Figure 15:
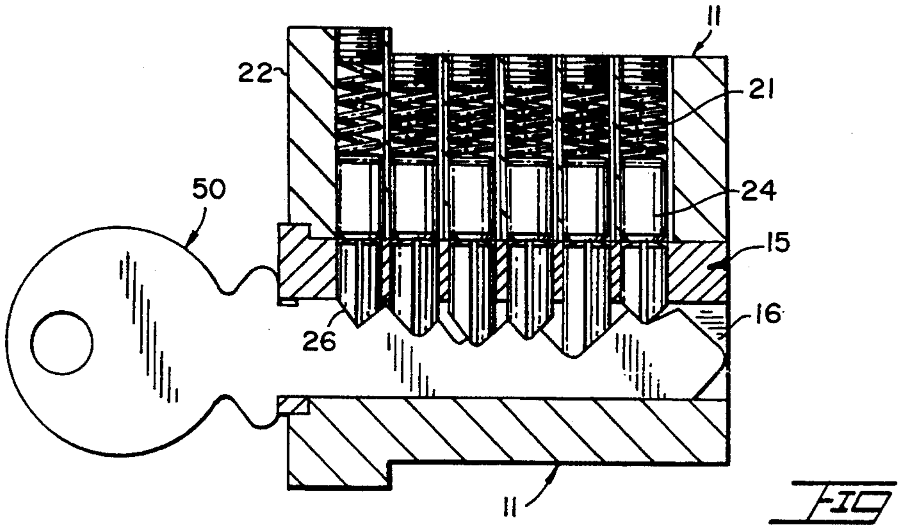
FIG. 15 is a longitudinal assembly view in longitudinal cross section of the lock assembly of FIGS. 13 and 14 along a major surface of a key inserted into the lock assembly in position to open the lock contained within the lock assembly.

A rotatable cylinder plug (15), shown in FIGS. 4, 15 and 16, is rotatably mounted within shell (11). Plug (15) has a longitudinal key slot (16) shown in FIG. 4, that receives a key (50), so that key (50) can rotate plug (15) within shell (11). The latter is provided with an axially extending plug receiving chamber (25) that rotatably receives plug (15). (See FIG. 3). Plug (15), as illustrated, is a replacement plug that is inserted within shell (11) after the latter is rebroached.

Shell (11) has a pair of axially drilled screw openings (17), each provided with a countersunk forward portion (18) for receiving threaded locking screws (not shown) and enlarged screw heads for said locking screws (also not shown). The screws are used to attach shell (11) and a protective collar (not shown) to an adjoining unit (not shown) in a door (not shown) in which the lock is installed. An adjoining unit depends on the lock function and could be either the other half of a double cylinder dead bolt, the thumb turn of a single cylinder dead bolt or a blank plate.

Each pin chamber (12) is of cylindrical shape and constructed and arranged to receive a set of components that comprise a multipart tumbler for its associated cylindrical pin chamber (12). A retainer cap (20) is constructed and arranged to close the upper end of each cylindrical pin chamber (12) by screwing, and to open said cylindrical pin chamber (12) by unscrewing. The multiple part tumbler includes a spring (21), a top pin or driver (24), and a bottom pin (26) as its components. In addition, a flag (27) that extends radially outward from bottom pin (26) for alignment with preexisting broach (13) prior to rebroaching, is aligned with an associated broach (14) from the second set of broaches (14) after rebroaching, as will be explained later. The bottom surface of bottom pin (26) will be referred to as a bottom edge portion of said bottom pin. The bottom edge portions cooperate to serve as key contacting means. In the drawings, bottom pins (26) and flags (27) that are illustrated, refer to the bottom pins and associated flags that replace the preexisting bottom pins and associated flags after rebroaching.

Each preexisting broach (13) of shell (11) is initially oriented away from front face (22) of shell (11). The depth of each broach (13) or (14) is measured radially from the radially inner broach circumference to the radially outer edge of the broach and is critical. The width of each broach (13) or (14) is measured along the outer circumferential line of its associated pin chamber (12), and is also critical. Flags from original bottom pins are free to swing within the depth and width of their associated preexisting broaches (13) prior to rebroaching. After rebroaching, flags (27) from bottom pins (26) are free to swing within replacement broaches (14) to align in a plug (15) to enable the bottom edge portion of its associated bottom pin (26) to form a portion of key-contacting means that is engaged by an inserted key (50), as shown in FIG. 15.

Each cylindrical pin chamber (12) of shell (11) is constructed and arranged to receive a broach guide (30). The latter has a pair of aligning pin guide openings (31) and (32) flanking a central guideway (33). A T-shaped aligning pin (34) is provided with an enlarged head (35) to support pin (34) by gravity on the upper surface of broach guide (30) when pin (34) is inserted into either pin guide opening (31) or (32) as needed to operate broach guide (30) properly. Aligning pin (34) extends into an adjoining pin chamber (12) next to the pin chamber (12) to be broached on either side of the pin chamber (12) to be broached depending on whether aligning pin (34) is inserted through pin guide opening (31) or (32).

Shell (11) has a front face (22) and an enlarged annular face rim (23) at its front end. Front face (22) of shell (11) facing one of the aligning pin openings (31) or (32) is offset so that broach guide (30) can abut against both front face (22) and annular face rim (23). Reference letter A in FIG. 3 depicts the axial thickness of rim (23).

Figure 5:
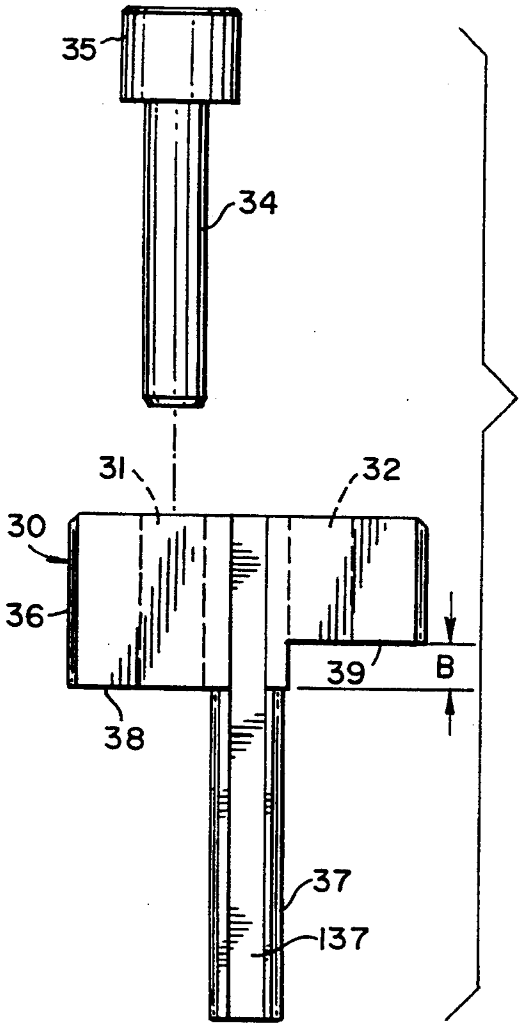
FIG. 5 is an exploded view in elevation of a broach guide and an aligning pin.
Figure 8:
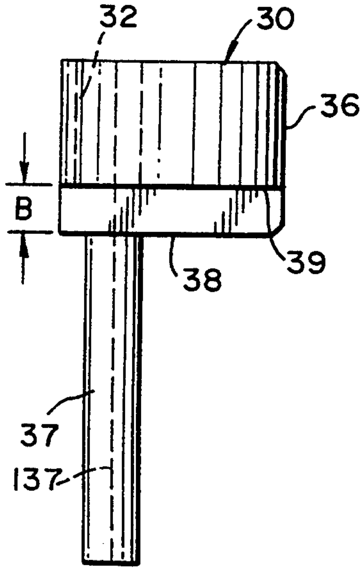
FIG. 8 is a side view of the broach guide of FIG. 5.

Broach guide (30) has an enlarged head (36) and a longitudinally slotted stem (37). Enlarged head (36) has a front surface (38) that includes a recessed front surface portion (39). The distance that surface portion (39) is recessed from front surface (38), is depicted in FIG. 5 and FIG. 8 by reference letter B. Distance B is approximately equal to the distance A depicted in FIG. 3 to show the thickness of annular face rim (23), so that front surface (38) abuts front face (22) when recessed surface portion (39) abuts annular face rim (23).

The broach guide assembly of this invention also uses a broach cutter (40) constructed and arranged with a first end for insertion into central guideway (33). Broach cutter (40) has a first relatively small tooth (41) beyond its first end, a second intermediate size tooth (42) spaced above first tooth (41), a third relatively large tooth (43) spaced above second tooth (42), a lower cut-out portion (44) between first tooth (41) and second tooth (42), an upper cut-out portion (45) between second tooth (42) and third tooth (43), and an upper narrow shaft portion (46).

Figure 7:
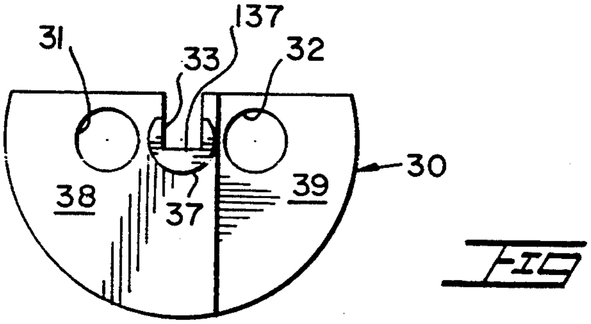
FIG. 7 is a bottom view of the broach guide of FIG. 5, with the aligning pin of FIG. 5 removed.
Figure 9:
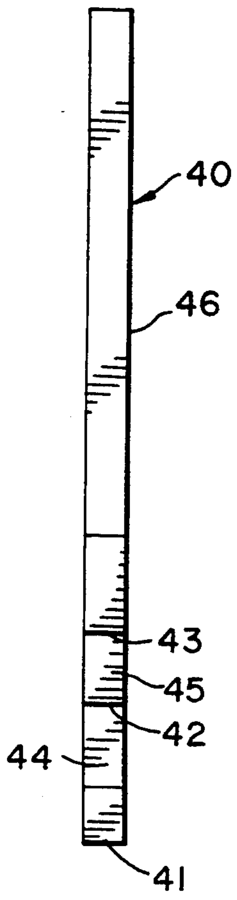
FIG. 9 is a front elevation of a broach cutter that is useful with the present invention.
Figure 10:
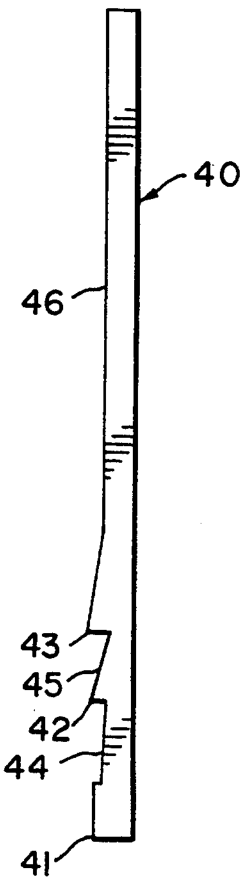
FIG. 10 is a side elevational view of the broach cutter of FIG. 9.
Figure 11:
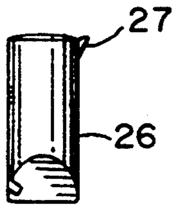
FIG. 11 is a rear elevation of a cylindrical bottom pin of a typical set of components that comprises a tumbler insertable into any one of the cylindrical pin chambers formed in the shell of FIG. 3, and showing a flag extending radially outward from the upper axial end portion of said cylindrical bottom pin.
Figure 12:
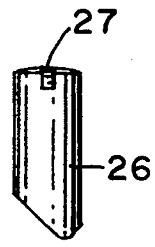
FIG. 12 is a side elevational view of the cylindrical bottom pin of FIG. 11.
Figure 14:
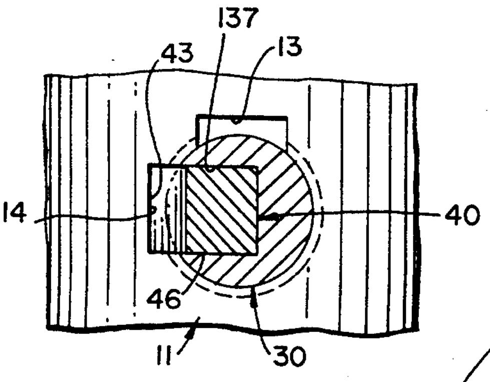
FIG. 14 is a horizontal sectional view of the lock assembly of FIG. 13, taken along the line 14—14 of FIG. 13 in the vicinity of said cylindrical pin housing depicted in FIG. 13.
Figure 13:
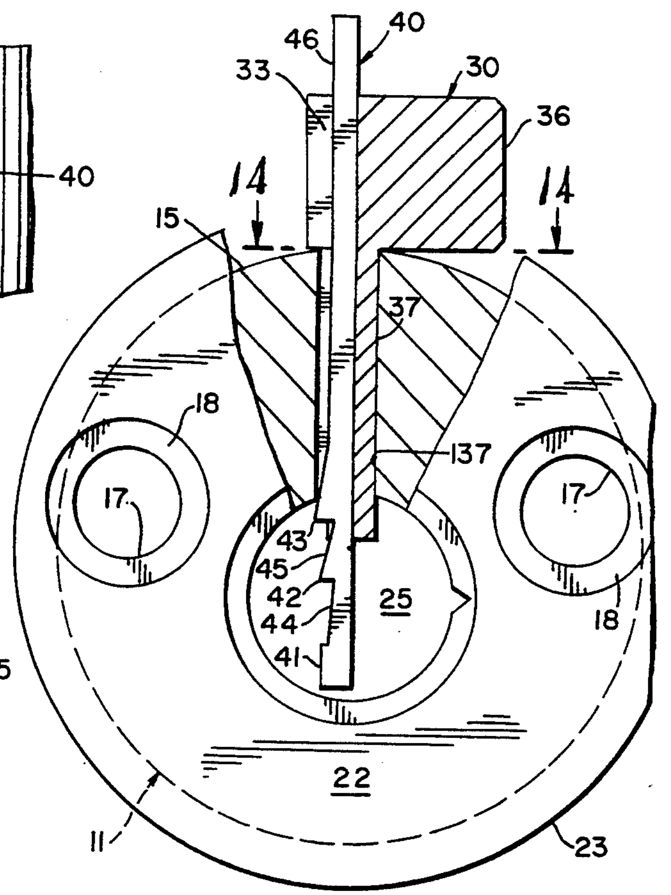
FIG. 13 is an end view, partly broken away in section, of a lock assembly according to this invention, with the broken away portion intersecting one of the cylindrical pin housings when a broach cutter and a broach guide are inserted through said cylindrical pin housing to establish a second broach for said cylindrical pin housing.

In use, broach guide (30) is aligned with a pin chamber (12) to be rebroached. Broach guide (30) is held in alignment by inserting aligning pin (34) into one of the aligning pin guides (31) or (32) flanking guideway (33) and into a pin chamber (12) next to the pin chamber (12) to be broached. Once broach guide (30) is aligned, the first end of broach cutter (40) near first tooth (41) is inserted into central guideway (33). The latter communicates with a longitudinal slot (137) of stem (37) as shown in FIGS. 5, 7 and 13.

Broach cutter (40) fits snugly within guideway (33) and longitudinal slot (137). When stem (37) enters any pin chamber (12), broach cutter (40) is gently tapped into said pin chamber (12) to cut a new broach (14). Tooth (41) makes a slight cut in pin chamber (12) upon its insertion. As broach cutter (40) continues its penetration into pin chamber (12), second tooth (42) cuts more deeply than did first tooth (41). This additional cutting by second tooth (42) causes the metal of shell (11) to burr. The resulting burrs collect in lower cutout portion (44). Continued penetration of broach cutter (40) causes additional burring by largest third tooth (43) with excess metal held within upper cutout portion (45).

As broach cutter (40) continues down into plug receiving chamber (25), it completes the cutting of broach (14). As broach cutter (40) is driven further downward, its fit within pin chamber (12) becomes tighter and tighter until it forms a friction fit. Inherently, cutout portions (44) and (45) temporarily store the shaved metal filings cut by second tooth (42) and third tooth (43), respectively. Broach guide (30) and broach cutter (40) are so constructed and arranged that when stem (37) of broach guide (30) is inserted into a cylinder pin chamber (12) of cylinder shell (11), broach cutter (40) moves through guideway (33) and longitudinal slot (137) into said cylinder pin chamber (12) to broach the latter.

The distance between the first end and third tooth (43) is less than the diameter of plug receiving chamber (25) so that the metal filings temporarily stored in cutout portions (44) and (45) drop into plug chamber (25) when broach cutter (40) is further inserted. Filings cut by first tooth (41) drop directly into plug chamber (25).

Because of the close friction fit between broach cutter (40) and pin chambers (12), danger of damaging the wall of each pin chamber (12) during withdrawal of broach cutter (40) therefrom makes it advisable to reduce the cross-section of narrow top shaft portion (46). A preferred embodiment of this invention has broach cutter (40) provided with a top shaft portion (46) that is narrower than its lower portion comprising teeth (41), (42) and (43) so that broach guide (30) can be released first (after broach cutter (40) is extended as far into plug chamber (25) as possible). Broach guide (30) is then removed with broach cutter (40) still in place. Then broach cutter (40) is removed from its associated pin chamber (12) after removing its associated broach guide (30) therefrom.

Axially extending plug receiving chamber (25) has a given diameter. Broach cutter (40) is constructed of such a length between its first end and its upper cutout portion (45) that its first end remains spaced from a portion of the wall of plug receiving chamber (25) diametrically opposite a point of entry of broach cutter (40) into plug receiving chamber (25) when upper cutout portion (45) penetrates the point of entry. Therefore, the inner surface of the wall of plug receiving chamber (25) need not be damaged by the first end of broach cutter (40) during the rebroaching operation.

In summary, the present invention installs a new keyway by replacing a preexisting plug and by rebroaching shell (11) of a preexisting locking system. This is performed by removing each retainer cap (20) from its associated pin chamber (12), removing the preexisting spring (21), the top pin or driver (24) and the bottom pin with its associated flag from one or more pin chambers (12), withdrawing the preexisting plug from plug receiving chamber (25), rebroaching each chamber along a common radial plane at a fixed angle relative to the common radial plane occupied by a preexisting broach (13) along a line parallel to the axis of each pin chamber and reassembling at least one set of components different from those of the first set in said pin chambers (12) after rebroaching said chambers (12) in such a manner that flags (27) are received in the newly formed broaches (14). Preferably, only plug (15) and bottom pin (26) for one or more of the associated pin chambers (12) need replace the preexisting plug and preexisting bottom pin of said associated pin chamber(s) after rebroaching.

While the drawings show new broaches (14) formed at angles of 90 degrees with respect to the common plane in which the preexisting broaches (13) lie, it is understood that the new broaches (14) may be formed at any constant angle relative to the circumferential positions of the first broaches (13). It is preferred to form the second broaches (14) at a constant angle in the same circumferential direction (that is, clockwise or counterclockwise) relative to the first broach (13) of each pin chamber (12) and that the angle between first and second broaches be large enough to maintain the rigidity of the circumference of each pin chamber (12) after the second broach (14) is made.

It is understood that replacement plug (15) already drilled with chambers (112) and broached with broaches (114) conforming to chambers (12) and broaches (14) of shell (11) is inserted into plug receiving chamber (25) of shell (11) after the rebroaching of shell (11) is completed. After insertion, the chambers (12) and new set of broaches (14) of shell (11) are aligned with chambers (112) and broaches (114) of newly inserted replacement plug (15). FIG. 16 shows the details of construction of replacement plug (15).

The broach guide (30) is locked in the same arrangement for each pin chamber (12) to insure that each second broach (14) is oriented at the same circumferential angle with respect to its associated first or preexisting broach (13) for each pin chamber (12). In cross-section, broach guide (30) is nearly circular, except for a short portion of the periphery that is removed to leave a short flattened peripheral portion of sufficient size to enable a user of the rebroaching apparatus to observe the progress of the cutting needed to perform the rebroaching step.

Conforming to the provisions of the patent statutes, applicant has provided an explanation of the principle, preferred construction and mode of operation of this invention and has illustrated and described what is now considered to be its best embodiment. It is understood, however, that within the scope of the claimed subject matter that follows, the invention may be practiced otherwise than as specifically illustrated and described.

What is claimed is:

1. A method of rebroaching a rotatable tumbler cylinder lock, said lock comprising a cylinder plug having a given longitudinal axis and rotatable within a cylinder shell about said longitudinal axis under control of a plurality of rotatable tumblers, said shell having a plurality of cylindrical pin chambers spaced along the length of said cylindrical shell, each of said cylindrical pin chambers being constructed and arranged to receive any one of said rotatable tumblers and having a preexisting broach oriented in a first common radial plane extending through said given longitudinal axis, said plurality of rotatable tumblers including at least one of said rotatable tumblers received in at least one of said cylindrical pin chambers, said at least one of said rotatable tumblers in at least one of said cylindrical pin chambers being provided with key-contactable surface means for allowing actuation of said at least one rotatable tumbler within said at least one cylindrical pin chamber to a key-contacting position associated with said at least one tumbler, said at least one tumbler comprising a preexisting set of components comprising a cap, a spring, a top pin and a bottom pin received within said at least one cylindrical pin chamber, said bottom pin having a flag extending radially outward therefrom and into a respective preexisting broach to define the orientation of said key-contactable surface means, said method comprising withdrawing said plug from said shell, removing said at least one rotatable tumbler from said at least one cylindrical pin chamber, rebroaching said at least one cylindrical pin chamber in said shell to define a second broach for said at least one cylindrical chamber along a second common radial plane oriented at a fixed angle to said first common radial plane, and reassembling within said at least one rebroached cylindrical pin chamber at least one component of a replacement set of components comprising a cap, a spring, a top pin, a bottom pin having key-contactable surface means of different configuration from that of said at least one rotatable tumbler, and a flag inserted to extend into said second broach, thereby replacing said preexisting set of components with said replacement set of components.

2. A method as in claim 1, wherein said rebroaching step is performed along a second common radial plane oriented at approximately 90 degrees to said first common radial plane.

3. A method as in claim 2, wherein said rebroaching step is performed along a second common radial plane oriented in a counter-clockwise direction relative to said first common radial plane.

4. A method as in claim 1, including replacing said preexisting set with a replacement set by replacing said bottom pin only of said preexisting set with a different bottom pin of different configuration for said replacement set.

5. A method as set forth in claim 1, wherein said rebroaching step is accomplished using a broach guide having a central guideway, a pair of aligning pin guides flanking said central guideway and spaced from said central guideway at a distance equal to a common distance between adjacent of said cylindrical pin chambers in said shell, aligning said central guideway with a cylindrical pin chamber to be broached while at least one of said aligning pin guides is automatically aligned with an adjacent cylindrical pin chamber, inserting a broach cutter into said central guideway and into said cylindrical pin chamber to be broached until a first end of said broach cutter reaches an axially extending plug receiving chamber within said shell thereby cutting a new broach extending along a peripheral wall of said cylindrical pin chamber circumferentially spaced from a preexisting broach, and withdrawing said broach cutter from said cylindrical pin chamber.

6. A method as set forth in claim 1, wherein said broach cutter has a first end, a first relatively narrow tooth portion beyond its first end, a first recessed portion beyond said relatively narrow tooth portion, a second tooth portion of intermediate width beyond said first recessed portion, a second recessed portion beyond said second tooth portion of intermediate width, a third tooth portion of relatively greater width beyond said second recessed portion and a rear portion of narrowest width beyond said second recessed portion, and further comprising temporarily storing metal removed from said cylindrical shell by said second tooth portion and said third tooth portion during-said broaching within said recessed portions during said broaching and then transferring said metal into said plug receiving chamber within said shell.

7. A method as set forth in claim 6, wherein said axially extending chamber within said shell has a given diameter and said broach cutter has a lower elongated portion between said first end and said third tooth portion whose length is less than said given diameter, said method comprising inserting said broach cutter into said shell via said first end until said third tooth portion enters said plug receiving chamber and said first end remains spaced from a portion of the wall of said plug receiving chamber diametrically opposite a point of entry for said first end into said plug receiving chamber, and then withdrawing said broach cutter from said plug receiving chamber.

* * * * *